United States Patent
Iiba et al.

(10) Patent No.: US 11,491,429 B2
(45) Date of Patent: Nov. 8, 2022

(54) NONWOVEN FABRIC AND FILTER

(71) Applicant: MITSUI CHEMICALS, INC., Tokyo (JP)

(72) Inventors: Kozo Iiba, Ichihara (JP); Takeshi Kikutani, Tokyo (JP); Wataru Takarada, Tokyo (JP); Sho Hatano, Tokyo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 278 days.

(21) Appl. No.: 17/042,433

(22) PCT Filed: Oct. 26, 2018

(86) PCT No.: PCT/JP2018/039982
§ 371 (c)(1),
(2) Date: Sep. 28, 2020

(87) PCT Pub. No.: WO2019/187282
PCT Pub. Date: Oct. 3, 2019

(65) Prior Publication Data
US 2021/0077930 A1    Mar. 18, 2021

(30) Foreign Application Priority Data
Mar. 29, 2018    (JP) .............................. JP2018-066081

(51) Int. Cl.
*B01D 39/16*    (2006.01)
*D04H 3/007*    (2012.01)
*D04H 3/16*    (2006.01)

(52) U.S. Cl.
CPC ......... *B01D 39/1623* (2013.01); *D04H 3/007* (2013.01); *D04H 3/16* (2013.01); *B01D 2239/0618* (2013.01); *B01D 2239/0622* (2013.01); *B01D 2239/1233* (2013.01); *B01D 2239/1291* (2013.01); *D10B 2321/022* (2013.01); *D10B 2505/04* (2013.01)

(58) Field of Classification Search
None
See application file for complete search history.

(56) References Cited

FOREIGN PATENT DOCUMENTS

| EP | 2 325 248 A1 | 5/2011 |
| WO | 0022219 A1 | 4/2000 |
| WO | 2012111724 A1 | 8/2012 |
| WO | 2015093451 A1 | 6/2015 |

OTHER PUBLICATIONS

Sugimoto, M. et al. "Melt rheology of long-chain-branched polypropylenes" Rheologica Acta, Springer-Verlag, DE, vol. 46 No. 1, Dec. 21, 2005 (Dec. 21, 2005), pp. 33-44, XP019473710, ISSN: 1435-1528. (Cited in Extended European Search Report dated Dec. 15, 2021, for EP Application No. 18911499.4).
International Search Report (PCT/ISA/210) and an English translation thereof dated Jan. 22, 2019, by the Japanese Patent Office as the International Searching Authority for International Application No. PCT/JP2018/039982.
Written Opinion (PCT/ISA/237) dated Jan. 22, 2019, by the Japanese Patent Office as the International Searching Authority for International Application No. PCT/JP2018/039982.

*Primary Examiner* — Arti Singh-Pandey
(74) *Attorney, Agent, or Firm* — Buchanan, Ingersoll & Rooney PC

(57) ABSTRACT

A nonwoven fabric, including fibers, in which the fibers have an elongational viscosity, as measured under conditions at an elongational strain rate of $2.5 \times 10^2$ (1/s) and a temperature of 160° C., of from 430 Pa·s to 1200 Pa·s, and a ratio of the elongational viscosity (Pa·s) to a shear viscosity (Pa·s) of the fiber, as measured under conditions at a shear strain rate of $2.5 \times 10^2$ (1/s) and a temperature of 160° C., is from 35 to 65.

14 Claims, No Drawings

NONWOVEN FABRIC AND FILTER

TECHNICAL FIELD

The present disclosure relates to a nonwoven fabric and a filter.

BACKGROUND ART

In a nonwoven fabric manufactured by a melt blowing method (hereinafter, also referred to as a "melt blown nonwoven fabric"), the diameter of fibers that constitute the nonwoven fabric can be reduced as compared to that of fibers in a general spunbond nonwoven fabric. Therefore, the melt blown nonwoven fabric is superior in flexibility, uniformity, and fineness. Thus, the melt blown nonwoven fabric has been used alone or as a layered fabric, in which the melt blown nonwoven fabric has been layered on a different nonwoven fabric, for a filter such as a liquid filter or an air filter, sanitary materials, medical materials, coating materials for agricultural use, construction materials, building materials, oil absorption materials, automobile materials, electronic industry materials, a separator, clothing, wrapping materials, sound-absorbing materials, and the like.

As fibers that constitute a nonwoven fabric, fibers of thermoplastic resins such as polypropylene and polyethylene are known.

In general, filters are used for the purpose of collecting fine particles present in a liquid, gas, or the like, and removing the fine particles from the liquid, gas, or the like. It is known that the efficiency of a filter to collect fine particles (hereinafter, also referred to as "collection efficiency") tends to increase as the average fiber diameter of fibers of a nonwoven fabric that constitutes the filter becomes smaller. It is also known that the collection efficiency decreases as the particle diameter of the fine particles becomes smaller.

For example, in International Publication WO 2000/22219 and International Publication WO 2015/093451, as nonwoven fabrics having a small average fiber diameter, nonwoven fabrics obtained by shaping resin compositions containing polyethylene and polyethylene wax using a melt blowing method are proposed, for example.

In addition, for example, in International Publication WO 2012/111724, a nonwoven fabric layered body in which a nonwoven fabric, which is obtained by shaping a resin composition containing polyethylene and polyethylene wax using a melt blowing method, is layered on a spunbond nonwoven fabric, which includes a composite fiber formed from a polyester and an ethylene-based polymer, is proposed.

SUMMARY OF INVENTION

Technical Problem

The present inventors have made investigations and found that when the nonwoven fabrics described in International Publication WO 2000/22219, International Publication WO 2015/093451, and International Publication WO 2012/111724 are used as filters, further improvement in collection efficiency is sometimes required.

The present inventors have made further investigations and found that even when different nonwoven fabrics each including fibers having the same average fiber diameter are used as filters, collection efficiencies of the filters are sometimes different from one another. Furthermore, it is found that when the content of fibers having a fiber diameter that is 5 or more times as large as the average fiber diameter (hereinafter, also referred to as "5-times fibers") is high, collection efficiency is sometimes inferior.

Accordingly, one embodiment of the present disclosure provides a nonwoven fabric having excellent collection efficiency, or in other words a nonwoven fabric having a small average fiber diameter and a low 5-times fiber content, or a filter using the nonwoven fabric.

Solution to Problem

The present disclosure includes the following embodiments.

<1> A nonwoven fabric, including fibers, wherein the fibers have an elongational viscosity, as measured under conditions at an elongational strain rate of $2.5 \times 10^2$ (1/s) and a temperature of 160° C., of from 430 Pa·s to 1200 Pa·s, and a ratio of the elongational viscosity (Pa·s) to a shear viscosity (Pa·s) of the fiber, as measured under conditions at a shear strain rate of $2.5 \times 10^2$ (1/s) and a temperature of 160° C., is from 35 to 65.

<2> The nonwoven fabric according to <1>, wherein the shear viscosity is from 10 Pas to 20 Pa·s.

<3> The nonwoven fabric according to <1> or <2>, wherein the fibers are formed from a resin composition.

<4> The nonwoven fabric according to <3>, wherein the resin composition contains a long-chain branched polypropylene.

<5> The nonwoven fabric according to <4>, wherein a content of the long-chain branched polypropylene is from 0.7% by mass to 5% by mass with respect to a total mass of the resin composition.

<6> The nonwoven fabric according to <3> or <4>, wherein the resin composition further contains a linear polypropylene.

<7> The nonwoven fabric according to <6>, wherein a content of the linear polypropylene is from 95% by mass to 99.3% by mass with respect to a total mass of the resin composition.

<8> The nonwoven fabric according to <6> or <7>, wherein the linear polypropylene comprises a linear polypropylene having a weight-average molecular weight of 20,000 or more.

<9> The nonwoven fabric according to <8>, wherein a content of the linear polypropylene having a weight-average molecular weight of 20,000 or more is 50% by mass or more with respect to a total mass of the linear polypropylene.

<10> The nonwoven fabric according to any one of <6> to <9>, wherein the linear polypropylene comprises a linear polypropylene having a weight-average molecular weight of less than 20,000.

<11> The nonwoven fabric according to <10>, wherein a content of the linear polypropylene having a weight-average molecular weight of less than 20,000 is 50% by mass or less with respect to a total mass of the linear polypropylene.

<12> The nonwoven fabric according to any one of <1> to <11>, wherein the fibers have an average fiber diameter (Da) of 2.7 μm or less.

<13> The nonwoven fabric according to <12>, wherein a ratio of a standard deviation (Dd) of the average fiber diameter to the average fiber diameter (Da) (Dd/Da) is from 70 to 100.

<14> The nonwoven fabric according to any one of <1> to <13>, wherein, in the fibers, a content of fibers having a fiber diameter that is 5 or more times as large as the average fiber diameter is 20% by mass or less.

<15> The nonwoven fabric according to any one of <1> to <14>, wherein the nonwoven fabric is a melt blown nonwoven fabric.

<16> A filter, including the nonwoven fabric according to any one of <1> to <15>.

Advantageous Effects of Invention

According to one embodiment of the present disclosure, a nonwoven fabric having excellent collection efficiency, or in other words a nonwoven fabric having a small average fiber diameter and a low 5-times fiber content, or a filter using the nonwoven fabric can be provided.

BRIEF DESCRIPTION OF DRAWINGS

Herein, a range of numerical values represented by "to" refers to a range including the numerical values before and after the word "to" as minimum and maximum values, respectively. When a plurality of ranges of numerical values is successively described herein, an upper limit value or a lower limit value in a certain range of numerical values may be replaced with an upper limit value or a lower limit value in another range of numerical values in the successively described ranges of numerical values. An upper limit value or a lower limit value of a certain range of numerical values among ranges of numerical values described herein may be replaced with a value shown in Examples.

Herein, when there is a plurality of materials corresponding to each component in a composition, the amount of each component in the composition refers to a total amount of the plurality of materials in the composition.

Herein, a combination of preferred embodiments is a more preferred embodiment.

<<Nonwoven Fabric>>

The nonwoven fabric of the present disclosure is a nonwoven fabric including fibers, wherein the fibers have an elongational viscosity, as measured under conditions at an elongational strain rate of $2.5 \times 10^2$ (1/s) and a temperature of 160° C., of from 430 Pa·s to 1200 Pa·s, and a ratio of the elongational viscosity (Pa·s) to the shear viscosity (Pa·s) of the fibers, as measured under conditions at a shear strain rate of $2.5 \times 10^2$ (1/s) and a temperature of 160° C. (elongational viscosity/shear viscosity), is from 35 to 65.

Since the nonwoven fabric of the present disclosure includes fibers, and the fibers have a ratio of the elongational viscosity (Pa·s) of the fibers, as measured under conditions at an elongational strain rate of $2.5 \times 10^2$ (1/s) and a temperature of 160° C. to the shear viscosity (Pa·s) of the fibers, as measured under conditions at a shear strain rate of $2.5 \times 10^2$ (1/s) and a temperature of 160° C. (elongational viscosity/shear viscosity) of from 35 to 65, the amount of 5-times fibers is small, and the average fiber diameter is small. Thus, since the amount of 5-times fibers is small and the average fiber diameter is small, the nonwoven fabric has excellent collection efficiency.

The present inventors speculate that the reason why, when the elongational viscosity and the ratio of the elongational viscosity to the shear viscosity are within specific ranges, the amount of 5-times fibers is small and the average fiber diameter is small in the fibers is as follows.

In spinning of fibers, a resin or a resin composition is discharged from thin nozzles, and drawn by high-speed airflow. When the elongational viscosity and the ratio of the elongational viscosity to the shear viscosity of the fibers are within specific ranges, even under high draw ratio conditions which is required for reducing the diameter of fibers, a phenomenon of repeatedly occurring periodic variations in fiber diameter, which means that the fiber diameter tentatively becomes large and small, (hereinafter, also referred to as "enlargement and reduction in fiber diameter") during drawing is suppressed. Thus, it is thought that the resulting fibers tend to have a small average fiber diameter and a uniform fiber diameter distribution.

When the fibers are fibers formed from a resin composition, the elongational viscosity and the shear viscosity of the fibers are the same as the elongational viscosity and the shear viscosity of the resin composition before forming the fibers.

The fibers included in the nonwoven fabric according to the present disclosure have an elongational viscosity, as measured under conditions at an elongational strain rate of $2.5 \times 10^2$ (1/s) and a temperature of 160° C., of from 430 Pa·s to 1200 Pa·s.

When fibers have an elongational viscosity, as measured under conditions at an elongational strain rate of $2.5 \times 10^2$ (1/s) and a temperature of 160° C., of 430 Pa·s or more, a phenomenon of repeatedly occurring periodic enlargement and reduction in fiber diameter during drawing is suppressed. Thus, the 5-times fiber content in the resulting nonwoven fabric can be reduced, and collection efficiency can be increased. When elongational viscosity of the fibers is 1200 Pa·s or less, draw ratio can be increased by high-speed airflow, and thus the average fiber diameter can be decreased and collection efficiency can be improved.

Herein, the expression "elongational strain rate" refers to a rate of deformation of melted fibers in a uniaxial direction.

From the above-described standpoints, the elongational viscosity is preferably from 450 Pa·s to 1200 Pa·s, and more preferably from 550 Pa·s to 1000 Pa·s.

The shear viscosity, as measured under conditions at a shear strain rate of $2.5 \times 10^2$ (1/s) and a temperature of 160° C. is, from the standpoint of further reducing the average fiber diameter, preferably from 10 Pa·s to 100 Pa·s, and more preferably from 10 Pa·s to 20 Pa·s.

When the shear strain rate is within the above-described range, ejection from nozzles is stabilized, and the average fiber diameter tends to be further reduced.

Herein, the expression "shear strain rate" refers to an average velocity of three-dimensional deformation of melted fibers.

The shear viscosity, as measured under conditions at a shear strain rate of $2.5 \times 10^2$ (1/s) and a temperature of 160° C. is, from the standpoint of further reducing the average fiber diameter, preferably from 10 Pa·s to 100 Pa·s, and more preferably from 10 Pa·s to 20 Pa·s.

When the shear strain rate is within the above-described range, the draw ratio can be increased by high-speed airflow, and thus the average fiber diameter tends to be further reduced.

Herein, the expression "shear strain rate" refers to a rate of three-dimensionally defined change in strain of a melted resin with respect to time, that is, a time derivative of the strain.

The elongational viscosity (Iie) and the shear viscosity ($\eta$) can be calculated from results obtained by measuring fibers or the following resin composition using a capillary rheometer (brand name: Capilograph 1D PMD-C, manufactured by Toyo Seiki Seisaku-sho, Ltd.) under conditions as described below.

[Measurement Conditions]

Measuring equipment: Capilograph 1D PMD-C (manufactured by Toyo Seiki Seisaku-sho, Ltd.)

Inner diameter of capillary: =0.2 [mm]

Analysis temperature: 160° C.

Length of capillary/inner diameter of capillary (L/D): 0.25 and 10

Piston speed: $2.5 \times 10^2$ (1/s)

The shear viscosity (η) (Pa·s) is calculated using the following formula from each of values the values representing an apparent shear stress and a shear strain rate when the above-described L/D is 10.

$$\eta = \frac{\tau}{\dot{\gamma}}$$

In the numerical formula, τ (Pa) refers to an apparent shear stress, and γ dot (Pa) ("γ dot" refers to a symbol in which a dot (.) is placed above a letter γ; hereinafter, also simply denoted by "γ̇") refers to a shear strain rate.

The apparent shear stress τ (Pa) is calculated from a piston load p (Pa), the inner diameter of capillary D (mm), and the length of capillary L (mm) using the following equation: τ=pD/π4 L. The shear stress γ (Pa) is calculated from a volumetric flow rate Q (mm³/s) using the formula: γ=32 Q/πD³.

The elongational viscosity (ηe) is calculated using the following formula from each of the values representing an apparent shear stress and a shear strain rate when the above-described L/D is 10, and each of the values when the above-described L/D is 0.2 using Cogswell's method.

The Cogswell's method can be carried out by referring to, for example, the description of "Cogswell, F. N. "Stretching flow instabilities at the exits of extrusion dies." Journal of Non-Newtonian Fluid Mechanics 2.1 (1977): 37-47".

$$\eta_e = \frac{9(n+1)^2 \Delta P_0^2}{32n\dot{\gamma}^2}$$

In the numerical formula, n represents a power-law index, γ dot ("γ dot" refers to a symbol in which a dot (.) is placed above a letter γ; hereinafter, also simply denoted by "γ̇") refers to a shear strain rate, and η refers to a shear viscosity (η) when the L/D is 10. $\Delta P_0^2$ refers to a square of the pressure loss which occurs in a die when the length of capillary is 0, and can be obtained by Baglay correction.

The Bagley correction of the length of capillary can be performed by referring to, for example, "Bagley, E. B. "The separation of elastic and viscous effects in polymer flow." Transactions of the Society of Rheology 5.1 (1961): 355-368".

The ratio of the elongational viscosity (Pa·s) to the shear viscosity (Pa·s) (elongational viscosity/shear viscosity) is from 35 to 65.

When the elongational viscosity/shear viscosity is from 35 to 65, the average fiber diameter is small, and the content of 5-times fibers is low, and the nonwoven fabric has excellent collection efficiency.

From the above-described standpoint, the elongational viscosity/shear viscosity is preferably from 35 to 60, and more preferably from 35 to 50.

<Resin Composition>

The fibers in a nonwoven fabric according to the present disclosure is not particularly limited as long as each of the elongational viscosity and the elongational viscosity/shear viscosity under predetermined conditions falls within the above-described range. The fibers may be fibers formed from a resin, and may be fibers formed from a resin composition.

From the standpoint of making the elongational viscosity and the elongational viscosity/shear viscosity under a predetermined condition to be easily controlled within the above-described range, the fibers in the nonwoven fabric of the present disclosure are preferably fibers formed from a resin composition.

When the fibers included in the nonwoven fabric according to the present disclosure are fibers formed from a resin composition, from the standpoint of improving collection efficiency by reducing the average fiber diameter, the resin composition preferably contains a linear polypropylene.

The linear polypropylene refers to a polypropylene having no long-chain branched structure. The long-chain branched structure is described in the following long-chain branched polypropylene section.

The linear polypropylene is not particularly limited, and may be a homopolymer of a linear propylene, or a copolymer of a linear propylene and α-olefin.

The α-olefin which is capable of copolymerizing is preferably an α-olefin having 2 or more carbon atoms, and more preferably an α-olefin having 2 or from 4 to 8 carbon atoms.

Specific examples of the α-olefin capable of copolymerizing include ethylene, 1-butene, 1-pentene, 1-hexene, 1-octene, and 4-methyl-1-pentene.

The linear polypropylene may include a linear polypropylene having a weight-average molecular weight of 20,000 or more (hereinafter, also referred to as a "high molecular weight linear polypropylene"), may include a linear polypropylene having a weight-average molecular weight of less than 20,000 (hereinafter, also referred to as a "low molecular weight linear polypropylene"), and may include both the high molecular weight linear polypropylene and the low molecular weight linear polypropylene.

A nonwoven fabric containing the high molecular weight linear polypropylene as a linear polypropylene is preferred because spinning is stabilized and the amount of 5-times fibers tends to be low.

A nonwoven fabric containing the low molecular weight linear polypropylene as a linear polypropylene is preferred because the viscosity during spinning can be decreased and draw ratio can be increased by high-speed airflow, and thus the diameter of the fibers tends to be reduced.

A nonwoven fabric containing both the high molecular weight linear polypropylene and the low molecular weight linear polypropylene as linear polypropylenes tend to reduce the viscosity during spinning within a range in which spinning can be stabilized, therefore the average fiber diameter tends to be reduced and the amount of 5-times fibers tends to be reduced, which is more preferred.

The weight-average molecular weight (Mw) of the high molecular weight linear polypropylene is preferably 20,000 or more, more preferably 30,000 or more, and still more preferably 40,000 or more.

The weight-average molecular weight (Mw) of the high molecular weight linear polypropylene is preferably 80,000 or less, more preferably 70,000 or less, and still more preferably 65,000 or less.

When the weight-average molecular weight (Mw) of the high molecular weight linear polypropylene is within the above-described range, the average fiber diameter tends to be reduced, which is preferred.

From the above-described standpoint, the weight-average molecular weight (Mw) of the high molecular weight linear polypropylene is preferably from 20,000 to 80,000, more preferably from 30,000 to 70,000, and still more preferably from 40,000 to 65,000.

The weight-average molecular weight (Mw) of the low molecular weight linear polypropylene is preferably less than 20,000, more preferably 15,000 or less, and still more preferably 13,000 or less. When the weight-average molecular weight (Mw) of the low molecular weight linear polypropylene is less than 20,000, the low molecular weight linear polypropylene has a relatively low molecular weight, and thus may be a wax-type polymer.

The weight-average molecular weight (Mw) of the low molecular weight linear polypropylene is preferably 400 or more, more preferably 1,000 or more, still more preferably 2,000 or more, and particularly preferably 6,000 or more.

When the weight-average molecular weight (Mw) of the low molecular weight linear polypropylene is within the above-described range, the average fiber diameter tends to be reduced, which is preferred.

From the above-described standpoint, the weight-average molecular weight (Mw) of the low molecular weight linear polypropylene is preferably 400 or more and less than 20,000, more preferably from 400 to 15,000, still more preferably from 1,000 to 14,000, and particularly preferably from 6,000 to 13,000.

The weight-average molecular weight (Mw) of a linear polypropylene refers to a weight-average molecular weight versus polystyrene standards as measured by gel permeation chromatography using the following system under the following conditions.

[GPC Measuring System]
Column: TOSO GMHHR-H(S)HT (manufactured by Tosoh Corporation)
Detector: RI detector for liquid chromatogram WATERS 150C (manufactured by Waters)
[Measurement Conditions]
Solvent: 1,2,4-trichlorobenzene
Analysis temperature: 145° C.
Flow rate: 1.0 ml/minute
Sample concentration: 2.2 mg/ml
Injection volume: 160 µl
Calibration curve: Universal Calibration
Analysis program: HT-GPC (Ver. 1.0)

The density of the high molecular weight linear polypropylene is not particularly limited. The density may be, for example, from 0.870 g/cm$^3$ to 0.980 g/cm$^3$, preferably from 0.900 g/cm$^3$ to 0.980 g/cm$^3$, more preferably from 0.920 g/cm$^3$ to 0.975 g/cm$^3$, and still more preferably from 0.940 g/cm$^3$ to 0.970 g/cm$^3$.

The density of the low molecular weight linear polypropylene is not particularly limited. The density may be, for example, from 0.890 g/cm$^3$ to 0.980 g/cm$^3$, preferably from 0.910 g/cm$^3$ to 0.980 g/cm$^3$, more preferably from 0.920 g/cm$^3$ to 0.980 g/cm$^3$, and still more preferably from 0.940 g/cm$^3$ to 0.980 g/cm$^3$.

Herein, the density of a polypropylene is represented by a value as measured at 25° C. and 1 atm (1013.25 hPa).

When the density of the high molecular weight linear polypropylene is 0.870 g/cm$^3$ or more, durability, heat resistance, strength, and stability over time of the resulting nonwoven fabric tend to be further improved. On the other hand, when the density of the high molecular weight linear polypropylene is 0.980 g/cm$^3$ or less, heat-sealing properties and flexibility of the resulting nonwoven fabric tend to be further improved.

When the density of the low molecular weight linear polypropylene is within the above-described range, the low molecular weight linear polypropylene is superior in kneadability with the high molecular weight linear polypropylene, and tends to be superior in spinnability and stability over time.

Herein, the density (g/cm$^3$) of a linear polypropylene is represented by a value obtained as follows. A strand obtained at the time of measuring a melt flow rate (MFR) at 230° C. and 2.16 kg load is heat treated at 120° C. for 1 hour, cooled slowly to room temperature (25° C.) over 1 hour, and thereafter measured using a density gradient tube according to JIS K 7112:1999.

The melt flow rate (MFR) of the linear polypropylene is not particularly limited as long as a nonwoven fabric can be manufactured by using the linear polypropylene in combination with a long-chain branched polypropylene as described below.

The melt flow rate (MFR) of the linear polypropylene is, from the standpoint of providing small average fiber diameter, spinnability, and the like, preferably from 1000 g/10 minutes to 2500 g/10 minutes, more preferably from 1200 g/10 minutes to 2000 g/10 minutes, and still more preferably from 1300 g/10 minutes to 1800 g/10 minutes.

Herein, the melt flow rate (MFR) of a linear polypropylene is represented by a value which is obtained by measurement under conditions at a load of 2.16 kg and a temperature of 230° C. according to ASTM D1238.

When the fibers included in the nonwoven fabric according to the present disclosure are fibers formed from a resin composition, the content of the linear polypropylene is, from the standpoint of improving collection efficiency by reducing the average fiber diameter and from the standpoint of achieving further stabilized spinning, preferably 90% by mass or more, more preferably 95% by mass or more, and still more preferably from 95% by mass to 99.3% by mass with respect to the total mass of the resin composition.

The linear polypropylenes may be used alone, or in combination of two or more.

When the fibers included in the nonwoven fabric according to the present disclosure are fibers formed from a resin composition, the content of the high molecular weight linear polypropylene is, from the standpoint of improving collection efficiency by reducing the average fiber diameter and from the standpoint of achieving further stabilized spinning, preferably from 50% by mass to 100% by mass, more preferably from 70% by mass to 100% by mass, still more preferably from 70% by mass to 99% by mass, and particularly preferably from 80% by mass to 95% by mass with respect to the total mass of the linear polypropylene.

When the fibers included in the nonwoven fabric according to the present disclosure are fibers formed from a resin composition, the content of the low molecular weight linear polypropylene is, from the standpoint of improving collection efficiency by reducing the average fiber diameter and from the standpoint of achieving further stabilized spinning, preferably more than 0% by mass and 50% by mass or less, more preferably more than 0% by mass and 30% by mass or less, still more preferably from 1% by mass to 30% by mass, and particularly preferably from 5% by mass to 20% by mass with respect to the total mass of the linear polypropylene.

When the nonwoven fabric according to the present disclosure contains both the high molecular weight linear polypropylene and the low molecular weight linear polypropylene as linear polypropylenes, from the standpoint of improving collection efficiency by reducing the average fiber diameter and from the standpoint of achieving further stabilized spinning, it is preferred that the content of the high molecular weight linear polypropylene is 50% by mass or more (more preferably 70% by mass or more, still more preferably from 70% by mass to 99% by mass, and particularly preferably from 80% by mass to 95% by mass) with respect to the total mass of the linear polypropylene, and the content of the low molecular weight linear polypropylene is 50% by mass or less (more preferably 30% by mass or less, still more preferably from 1% by mass to 30% by mass, and particularly preferably from 5% by mass to 20% by mass) with respect to the total mass of the linear polypropylene.

The content of the linear polypropylene in the propylene-based polymer is preferably 90% by mass or more, more preferably 95% by mass or more, and still more preferably from 95% by mass to 99.3% by mass with respect to the total mass of the propylene-based polymer.

When the content of the linear polypropylene is within the above-described range, the average fiber diameter tends to be further reduced. In addition, the balance among spinnability, fiber strength, collection efficiency of fine particles, and a filtration flow rate tends to be further improved.

Herein, the propylene-based polymer refers to a polymer in which the content of propylene with respect to the total constituent units of the polymer is 50% by mass or more.

<Long-Chain Branched Polypropylene>

When the fibers included in the nonwoven fabric according to the present disclosure are fibers formed from a resin composition, from the standpoint of further improving collection efficiency, the resin composition preferably further contains a long-chain branched polypropylene. From the standpoint of achieving finer fibers, the resin composition more preferably contains both a linear polypropylene and a long-chain branched polypropylene.

Herein, the long-chain branched polypropylene is polypropylene having a long-chain branched structure in the molecule. The term "long-chain branched structure" refers to a structure of a side chain of the polypropylene in which the length of the side chain is 10 or more carbon atoms. When the side chain has an additional branched structure, it is sufficient that the longest part has 10 or more carbon atoms.

Herein, a main chain of a polypropylene refers to a portion that is elongated by a reaction between polymerizable unsaturated groups. The side chain refers to a chain that is bonded to the main chain of a polymer.

Examples of commercially available long-chain branched polypropylene include WAYMAX (trade name of Japan Polypropylene Corporation).

The length of a side chain in a propylene-based polymer can be obtained by a method of measuring strain hardening by rheology properties of a resin.

Examples of the above-described method of measurement include a method described in Sugimoto, Masataka, et al. "Melt rheology of long-chain-branched polypropylenes." Rheologica acta 46.1 (2006): 33-44.

The weight-average molecular weight (Mw) of the long-chain branched polypropylene is, from the standpoint of improving collection efficiency by reducing the amount of 5-times fibers, preferably from 30,000 to 500,000, and more preferably from 80,000 to 300,000.

The weight-average molecular weight (Mw) of a long-chain branched polypropylene can be obtained by a method that is the same as that for the measurement of the weight-average molecular weight (Mw) of a linear polypropylene.

The melt flow rate (MFR) of the long-chain branched polypropylene is, from the standpoint of forming a film, preferably from 1 g/10 minutes to 20 g/10 minutes, and more preferably from 1 g/10 minutes to 10 g/10 minutes.

The melt flow rate (MFR) of a long-chain branched polypropylene can be obtained by a method that is the same as that for the measurement of the melt flow rate (MFR) of a linear polypropylene.

The method of manufacturing the long-chain branched polypropylene is not particularly limited. For example, the long-chain branched polypropylene can be manufactured by publicly known and used methods such as a direct polymerization method, an electron beam irradiation method, and a peroxide method.

When the fibers included in the nonwoven fabric according to the present disclosure are fibers formed from a resin composition and containing a long-chain branched polypropylene, the content of the long-chain branched polypropylene is, from the standpoint of achieving a smaller average fiber diameter, preferably from 0.7% by mass to 5% by mass with respect to the total mass of the resin composition.

From the above-described standpoints, the content of the long-chain branched polypropylene is more preferably from 0.7% by mass to 4% by mass, and still more preferably from 1% by mass to 2.5% by mass with respect to the total mass of the resin composition.

The long-chain branched polypropylenes may be used alone, or in combination of two or more.

The content of the long-chain branched polypropylene with respect to the total mass of the propylene-based polymer is preferably from 0.7% by mass to 5% by mass, more preferably from 0.7% by mass to 4% by mass, and still more preferably from 1% by mass to 2.5% by mass.

When the content of the long-chain branched polypropylene is within the above-described range, the average fiber diameter tends to be reduced and the specific surface area tends to be increased. In addition, the balance among spinnability, fiber strength, collection efficiency of fine particles, and a filtration flow rate tends to be improved.

When the fibers included in the nonwoven fabric according to the present disclosure are fibers formed from a resin composition, the total content of the high molecular weight polypropylene, the low molecular weight polypropylene, and the long-chain branched polypropylene described above is preferably 95% by mass or more, more preferably 99% by mass or more, and still more preferably 99.9% by mass or more with respect to the total mass of the fibers. The content within the above-described range is preferred because a smaller average fiber diameter can be achieved and the amount of 5-times fibers tends to be reduced.

When the fibers included in the nonwoven fabric according to the present disclosure are fibers formed from a resin composition, the resin composition may include one or more thermoplastic resins other than polypropylene, such as polyethylene (PE), a polyester resin, a polyolefin resin, polyetherimide (PEI), a polyamide (PA), polyetherketone (PEEK), polyvinyl chloride (PVC), polyethylene terephthalate (PET), polytrimethylene terephthalate (PTT), polybutylene terephthalate (PBT), polyethylene naphthalate (PEN), polybutylene naphthalate (PBN), polypropylene (PP), polyacetal (POM), polycarbonate (PC), polysulfone (PSF), polyethersulfone (PES), polyphenylene sulfide (PPS), and an ultrahigh molecular weight polyethylene.

When the fibers included in the nonwoven fabric according to the present disclosure are fibers formed from a resin composition, the resin composition may include, in addition to the linear polypropylene, the long-chain branched polypropylene, and the above-described other thermoplastic resin, publicly known additives such as an antioxidant, a weathering stabilizer, a light resistance stabilizer, antiblocking agents, lubricants, pigments, softeners, hydrophilic agents, an auxiliary agent, water repellents, a filler, and antimicrobials.

The average fiber diameter (Da) of fibers included in the nonwoven fabric of the present disclosure is, from the standpoint of improving collection efficiency, preferably 2.7 μm or less, more preferably 2.2 μm or less, and still more preferably 1.7 μm or less.

From the standpoint of maintaining strength when a filter is formed from the nonwoven fabric, the average fiber diameter (Da) of the fibers is preferably 0.3 μm or more, more preferably 0.5 μm or more, and still more preferably 0.8 μm or more.

The above-described average fiber diameter (Da) can be obtained as follows. A 1000 times magnified photographic image of the surface of a nonwoven fabric is obtained using an electron microscope (model number: S-3500N, manufactured by Hitachi, Ltd.), a hundred of fibers (n=100) are randomly selected in the obtained photographic image, diameters (widths) of the selected fibers are measured, and an arithmetic mean of the diameters is calculated as the average fiber diameter.

The standard deviation (Dd) of the average fiber diameter can be calculated using the above-described average fiber diameter (Da).

From the standpoint of improving collection efficiency, in fibers included in a nonwoven fabric, the content of the fibers having a fiber diameter that is 5 or more times as large as the average fiber diameter (Da) (hereinafter, also referred to as "5-times fibers") is preferably 20% or less, more preferably 17% or less, and still more preferably 14% or less.

The 5-times fibers can be identified by observing the nonwoven fabric using an electron microscope (model number: S-3500N, manufactured by Hitachi, Ltd.) to measure the diameter of a fiber.

The content of 5-times fibers is represented by a value calculated as follows. A 1000 times magnified photographic image of the surface of a nonwoven fabric is obtained using an electron microscope, a hundred fibers (n=100) are randomly selected in the obtained photographic image, diameters of the selected fibers are measured, and the above-described value is calculated using the following formula.

Content of 5-times fibers (%)=Numbers of fibers having a fiber diameter that is 5 or more times of average fiber diameter/Total number of measured fibers (n=100)×100

From the standpoint of improving collection efficiency, in the fibers included in a nonwoven fabric, the ratio of the standard deviation (Dd) of the above-described average fiber diameter (Da) to the average fiber diameter (Da) (Dd/Da) is preferably 110 or less, more preferably 100 or less, still more preferably 90 or less. From the same standpoint, Dd/Da is preferably 70 or more.

Moreover, from the same standpoint, Dd/Da is preferably from 70 to 110, more preferably from 70 to 100, and still more preferably from 70 to 90.

The nonwoven fabric of the present disclosure may be used as a layered nonwoven fabric in which the nonwoven fabrics of the present disclosure are layered, or may be used as a layered nonwoven fabric in which the nonwoven fabric of the disclosure is layered on a different nonwoven fabric. The above-described different nonwoven fabric is not particularly limited, and examples include various publicly known short fiber nonwoven fabrics and long fiber nonwoven fabrics (e.g., long fiber cellulose nonwoven fabrics) such as a spunbond nonwoven fabric, a melt blown nonwoven fabric, a wet nonwoven fabric, a spunlace nonwoven fabric, a dry nonwoven fabric, a dry pulp nonwoven fabric, an airlaid nonwoven fabric, a water-jet nonwoven fabric, a flash-spun nonwoven fabric, a spread nonwoven fabric, and a needle punched nonwoven fabric.

When the nonwoven fabric of the present disclosure is a nonwoven fabric manufactured by a melt blown method as described below (hereinafter, also referred to as a "melt blown nonwoven fabric"), the nonwoven fabric preferably contains no solvent component. The solvent component refers to, when the fibers included in the nonwoven fabric according to the present disclosure are fibers formed from a resin composition, an organic solvent component that is capable of dissolving the resin composition that constitutes the fiber. Examples of the solvent component include dimethylformamide (DMF).

The expression "contain no solvent component" means that the amount of solvent components is below the detection limit or less as measured by headspace gas chromatography.

The fibers of the nonwoven fabric of the present disclosure preferably have an interlaced point where the fibers are self-fused with each other. The self-fused interlaced point refers to, when the fibers included in the nonwoven fabric according to the present disclosure are fibers formed from a resin composition, a branching portion where the fibers are bonded to each other by fusion of the resin composition that constitutes the fibers. The self-fused interlaced point is distinguished from an interlaced point where fibers are bonded to each other through a binder resin.

The self-fused interlaced point is formed, for example, during a process of reducing the diameter of a fibrous propylene-based polymer by a melt blown method.

Whether fibers have an interlaced point where the fibers are self-fused with each other or not can be identified by an electron micrograph.

When the fibers of the nonwoven fabric of the present disclosure have an interlace point where the fibers are self-fused with each other, an adhesive component for bonding the fibers to each other may not necessarily be used. For example, in a melt blown nonwoven fabric including fibers having an interlaced point where the fibers are self-fused with each other, when the fibers included in the nonwoven fabric according to the present disclosure are fibers formed from a resin composition, a resin component other than the resin composition that constitutes the fibers may not necessarily be contained.

The specific surface area of a nonwoven fabric is, from the standpoint of further improving collection efficiency, preferably from 2.0 m$^2$/g to 20.0 m$^2$/g, more preferably from 3.0 m$^2$/g to 15.0 m$^2$/g, and still more preferably from 3.5 m$^2$/g to 10.0 m$^2$/g.

The specific surface area of a nonwoven fabric is represented by a value obtained according to JIS Z 8830:2013.

When the average fiber diameter and the specific surface area of a nonwoven fabric are within the above-described ranges, further improved collection efficiency can be achieved when the nonwoven fabric is used as a filter.

The average pore size of the nonwoven fabric of the present disclosure is preferably 10.0 μm or less, more preferably 3.0 μm or less, and still more preferably 2.5 μm or less.

The average pore size of the nonwoven fabric is preferably 0.01 μm or more, and more preferably 0.1 μm or more. If the average pore size is 0.01 μm or more, when the nonwoven fabric is used as a filter, pressure loss tends to be reduced, and flow rate tends to be maintained.

The maximum pore size of the nonwoven fabric of the present disclosure is preferably 20.0 μm or less, more preferably 6.0 μm or less, and still more preferably 5.0 μm or less.

The minimum pore size of the nonwoven fabric is preferably 0.01 μm or more, and more preferably 0.1 μm or more.

The pore sizes (the average pore size, the maximum pore size, and the minimum pore size) of the nonwoven fabric of the present disclosure can be measured by a bubble point method. In particular, according to JIS Z 8703:1983 (Standard Atmospheric Conditions for Testing), in a thermostatic chamber at a temperature of 20±2° C. and a humidity of 65±2%, a test piece of the nonwoven fabric is impregnated with a fluorine-based inert liquid (e.g., trade name: Fluorinert manufactured by 3M), and the pore sizes are measured using a capillary flow porometer (e.g., brand name: CFP-1200 AE, manufactured by Porous materials Inc.).

The basis weight of the nonwoven fabric of the present disclosure can be suitably designed according to applications. The basis weight is generally from 1 $g/m^2$ to 200 $g/m^2$, and preferably within a range of from 2 $g/m^2$ to 150 $g/m^2$.

The porosity of the nonwoven fabric of the present disclosure is generally 40% or more, preferably in a range of from 40% to 98%, and still more preferably in a range of from 60% to 95%.

When the nonwoven fabric of the present disclosure is embossed, the porosity of the nonwoven fabric refers to porosity in portions excluding the embossed portions.

Among the nonwoven fabrics of the present disclosure, the volume of portions having a porosity of 40% or more preferably accounts for 90% or more of the nonwoven fabric. More preferably, almost all of the portions of the nonwoven fabric have a porosity of 40% or more. When the nonwoven fabric of the present disclosure is used for a filter, preferably the nonwoven fabric has not been embossed, or more preferably almost all of the portions of the nonwoven fabric have not been embossed.

When the nonwoven fabric has not been embossed, pressure loss when a fluid is passed through a filter is reduced and the length of filter flow path is extended, and therefore filtering efficiency tends to be increased.

When the nonwoven fabric of the present disclosure is layered on a different nonwoven fabric, the different nonwoven fabric may have been embossed.

The air permeability of the nonwoven fabric is preferably from 3 $cm^3/cm^2/s$ to 30 $cm^3/cm^2/s$, more preferably from 5 $cm^3/cm^2/s$ to 20 $cm^3/cm^2/s$, and still more preferably from 8 $cm^3/cm^2/s$ to 12 $cm^3/cm^2/s$.

<Method of Manufacturing Nonwoven Fabric>

The method of manufacturing the nonwoven fabric of the present disclosure is not particularly limited, and publicly known methods such as an air-through method, a spunbond method, a needle punch method, a melt blown method, a carding method, a heat seal method, a water-stream confounding method, and a solvent adhesion method can be used.

Among these, from the standpoint of obtaining a nonwoven fabric having excellent comprehensive performances concerning lightweight properties, uniformity, strength, flexibility, and barrier performance, the method of manufacturing the nonwoven fabric is preferably a melt blown method or a spunbond method, and more preferably a melt blown method.

Examples of general methods for manufacturing a spunbond nonwoven fabric include the following method. The method includes melting a resin composition using an extruder, melt spinning the melted composition using a spunbond nonwoven fabric manufacturing machine having a plurality of spinnerets, cooling and drawing the long fiber formed by the spinning if necessary, thereafter depositing the resulting long fiber on a collection surface of the spunbond nonwoven fabric manufacturing machine, and subjecting the long fiber to a heating and compressing treatment using an embossing roll.

Widely known methods for cooling and drawing include an opened spunbond method, for example, disclosed in Japanese Patent Publication No. S48-28386 in which melt spun long fibers are manufactured by drawing with cooling in the air, and a closed spunbond method, for example, disclosed in Japanese Patent No. 3442896.

Examples of the method of manufacturing a melt blown nonwoven fabric include a manufacturing method having the following steps.

1) A step of discharging a melted resin composition (e.g., a mixture of a linear polypropylene and a long-chain branched polypropylene) together with a heated gas from a spinneret by a melt blown method to form a fibrous resin composition 2) A step of collecting the fibrous resin composition in a web form The melt blown method is one of methods for producing fleece in manufacturing a melt blown nonwoven fabric. When a melted resin composition is fibrously discharged from a spinneret, by blowing a heated and compressed gas on both side surfaces of melted state discharged materials and allowing the heated and compressed gas to coexist, the diameter of the discharged materials can be reduced.

Specifically, in the melt blown method, a resin composition as a raw material is melted using an extruder or the like, for example. The melted resin composition is introduced into a spinneret that is connected to a tip of the extruder, and fibrously discharged from a spinning nozzle of the spinneret. By pulling the discharged fibrous melted resin composition by a high-temperature gas (e.g., air), the diameter of the fibrous melted resin composition is reduced.

The discharged fibrous melted resin composition is pulled by a high-temperature gas, and as a result, the diameter of the resin composition is reduced to generally 1.4 μm or less, and preferably 1.0 μm or less. Preferably, the diameter of the fibrous melted resin composition is reduced to the limit with a high-temperature gas.

The diameter of the fibrous melted resin composition that has been reduced in diameter may be further reduced by applying a high voltage. When a high voltage is applied, the fibrous melted resin composition is pulled toward a collection side by an attractive force of the electric field, and the diameter of the fibrous melted resin composition is reduced. The voltage applied is not particularly limited, and may be from 1 kV to 300 kV.

In addition, the diameter of the fibrous melted resin composition may be further reduced by irradiation with a heat ray. When the fibrous melted resin composition is irradiated with a heat ray, the diameter of the fibrous melted resin composition is reduced, and remelting of the fibrous resin composition with reduced fluidity becomes possible. In addition, irradiation with a heat ray can further reduce the melt viscosity of the fibrous resin composition. Thus, even when a propylene-based polymer having a high molecular weight is used as a spinning raw material, fibers each having sufficiently reduced diameter can be obtained, and a melt blown nonwoven fabric having high strength can be obtained.

The heat ray refers to an electromagnetic wave having a wavelength of from 0.7 μm to 1000 μm, and particularly refers to a near infrared ray having a wavelength of from 0.7 μm to 2.5 μm. The strength and irradiation dose of the heat ray are not particularly limited as long as a fibrous melted propylene-based polymer can be remelted. For example, a near infrared lamp or a near infrared heater for from 1 V to 200 V, or preferably from 1 V to 20 V can be used.

The fibrous melted resin composition is collected in a web form. In general, the fibrous melted resin composition is collected and deposited by a collector. Thus, a melt blown nonwoven fabric is manufactured. Examples of the collector include a porous belt, a porous drum, and the like. The collector may have an air collection section, and the air collection section may facilitate collection of fibers.

The fibers may be collected in a web form on a desired substrate that has been disposed on the collector in advance. Examples of the substrate that has been disposed in advance include other nonwoven fabrics such as a melt blown nonwoven fabric, a spunbond nonwoven fabric, needle punching, and a spunlace nonwoven fabric; and textiles, knitted goods, paper, and the like. Accordingly, a melt blown nonwoven fabric layered body which is used for a high efficiency filter, a wiper, or the like may be obtained.

<Manufacturing Equipment for Melt Blown Nonwoven Fabric>

The manufacturing equipment for manufacturing the melt blown nonwoven fabric of the present disclosure is not particularly limited as long as the melt blown nonwoven fabric of the disclosure can be manufactured.

Examples of the manufacturing equipment for a melt blown nonwoven fabric include a manufacturing equipment that is equipped with:

1) an extruder for melting and transferring a resin composition;
2) a spinneret for fibrously discharging the melted resin composition that has been transferred from the extruder;
3) a gas nozzle for ejecting a high-temperature gas toward a lower part of the spinneret; and
4) a collector for collecting the fibrous melted resin composition discharged from the spinneret in a web form.

The extruder is not particularly limited, and may be a uniaxial extruder or a multi-axis extruder. A solid resin composition that has been introduced from a hopper is melted in a compression section.

The spinneret is disposed on a tip of the extruder. The spinneret is generally equipped with a plurality of spinning nozzles. For example, a plurality of the spinning nozzles is arranged in a row. The diameter of the spinning nozzle is preferably from 0.05 mm to 0.38 mm. The melted resin composition is transferred to the spinneret by the extruder, and introduced into the spinning nozzle. The fibrous melted resin composition is discharged from an opening of the spinning nozzle. The discharge pressure of the melted resin composition is generally within a range of from 0.01 kg/cm' to 200 kg/cm', and preferably within a range of from 10 kg/cm' to 30 kg/cm'. Accordingly, the discharge rate is increased, and mass production is realized.

The gas nozzle ejects the high-temperature gas toward a lower part of the spinneret, and more specifically around the opening of the spinning nozzle. The ejection gas may be air. It is preferred that the gas nozzle is disposed in the vicinity of the opening of the spinning nozzle, and the high-temperature gas is ejected toward the resin composition immediately after the resin composition is ejected from the opening of the nozzle.

The rate of the ejected gas (volume of discharge air) is not particularly limited, and may be from 4 $Nmm^3/min/m$ to 30 $Nmm^3/min/m$. The temperature of the ejected gas is generally from 5° C. to 400° C. or less, preferably in a range of from 250° C. to 350° C. Types of the ejected gas are not particularly limited, and compressed air may be used.

The manufacturing equipment for the melt blown nonwoven fabric may further be equipped with voltage application unit for applying a voltage to the fibrous melted resin composition that has been discharged from the spinneret.

In addition, the equipment may further be equipped with heat ray irradiation unit for irradiating the fibrous melted resin composition that has been discharged from the spinneret with a heat ray.

The collector that collects fibers in a web form is not particularly limited. For example, it is sufficient that fibers are collected on a porous belt. The mesh width of the porous belt is preferably from 5 mesh to 200 mesh. In addition, an air collection section may be disposed on the reverse side of the fiber collection surface of the porous belt to facilitate collection of fibers. The distance from the collection surface of the collector to the nozzle opening of the spinning nozzle is preferably from 3 cm to 55 cm.

<Use>

The nonwoven fabric of the present disclosure may be used, for example, as filters such as a gas filter (an air filter) and a liquid filter.

When the nonwoven fabric of the present disclosure is used as a filter, since the content of 5-times fibers is low and the average fiber diameter is small, the filter has an excellent collection efficiency.

When the nonwoven fabric of the present disclosure is a melt blown nonwoven fabric, if the melt blown nonwoven fabric satisfies at least one of the following conditions (1) to (3): (1) containing no solvent component; (2) containing no adhesive component for bonding the fibers to each other; and (3) undergone no embossing treatment, the content of impurities is reduced. Thus, the nonwoven fabric has high cleanability and filtering efficiency, and is suitably used as a high efficiency filter.

The filter for liquid may be formed of a monolayer of a nonwoven fabric, or may be formed of a layered body having two or more layers of nonwoven fabrics. When the layered body having two or more layers of nonwoven fabrics is used as the filter for liquid, the two or more layers of the nonwoven fabrics may be simply layered.

In the filter for liquid, according to purposes and types of liquid applied, the nonwoven fabric and another nonwoven fabric may be used in combination. For the purpose of increasing strength of the filter for liquid, a spunbond nonwoven fabric may be used, or a spunbond nonwoven fabric and a netlike material may be layered.

The liquid filter may be subjected to, for example, a calendering treatment using a pair of flat rolls with a clearance between the flat rolls so that the pore size is regulated to be small. The clearance between flat rolls may be suitably changed according to the thickness of the nonwoven fabric so that gaps present between fibers of the nonwoven fabric are not eliminated.

When heat treatment is performed during the calendering treatment, it is desired that heat compression bonding is performed at a temperature of the roll surface within a range of from 15° C. to 50° C. lower than the melting point of fibers formed from a resin composition. When the roll surface temperature is 15° C. or more lower than the melting point of the resin formed from a resin composition, film formation of the surface of a melt blown nonwoven fabric is suppressed, and deterioration in filter performance tends to be reduced.

EXAMPLES

The present disclosure is more specifically described below with reference to examples, but the present disclosure is not limited to the examples.

Example 1

A resin composition was obtained by melting and mixing 99.0 parts by mass of Achieve 6936G2 (brand name) (manufactured by Exxon Mobil Corporation, a propylene-based polymer having a weight-average molecular weight of 55,000, MFR: 1550 g/10 minutes) as a linear polypropylene 1(high molecular weight linear polypropylene) and 1.0 parts by mass of WAYMAX MFX3 (brand name) (manufactured by Japan Polypropylene Corporation, a long-chain branched polypropylene with a branched structure having 10 or more carbon atoms, MFR: 9) as a long-chain branched polypropylene (LCBPP).

The shear viscosity, the elongational viscosity, and the ratio of the elongational viscosity to the shear viscosity (elongational viscosity/shear viscosity) of the resulting resin composition are shown in Table 1. The elongational viscosity and the shear viscosity were measured by the above-described methods.

The resin composition obtained above was supplied to a die, and a melt blown nonwoven fabric was obtained by discharging the resin composition from the die having a nozzle diameter of 0.12 mm at a setting temperature of 230° C. and a rate per single nozzle hole of 12.5 mg/min together with heated air (280° C., 300 m$^3$/s) which was discharged from both sides of the nozzle. The shear viscosity and the elongational viscosity of the resulting melt blown nonwoven fabric were the same as those before the spinning, and the shear viscosity was 16 (Pa·S) and the elongational viscosity was 623 (Pa·S).

The content of fibers having a fiber diameter that was 5 or more times as large as the average fiber diameter (content of fibers with 5-times fiber diameter), and the ratio of the standard deviation (Dd) of fiber diameters to the average fiber diameter (Da) (Dd/Da) in the resulting melt blown nonwoven fabric are shown in Table 1.

The average fiber diameter (Da) and the content of fibers with 5-times fiber diameter were measured by the above-described methods and used for calculation.

(Example 2 to Example 4 and Comparative Example 1 to Comparative Example 3, Comparative Example 5, and Comparative Example 6)

Melt blown nonwoven fabrics were obtained by the same procedure as in Example 1 except that the ratios of components were changed as in resin compositions shown in Table 1. The values representing physical properties of the resulting resin compositions and melt blown nonwoven fabrics are shown in Table 1.

The elongational viscosity, the shear viscosity, and the average fiber diameter were measured by the above-described methods and used for calculation.

Comparative Example 4

A melt blown nonwoven fabric was obtained by the same procedure as in Example 1 except that 1 part by mass of a linear polypropylene 2 (brand name: J105G, MFR: 9 g/10 minutes, manufactured by Prime Polymer Co., Ltd.) was used instead of 1 part by mass of the long-chain branched polypropylene (LCBPP) in Example 1. The values representing physical properties of the resulting resin compositions and melt blown nonwoven fabrics are shown in Table 1.

The elongational viscosity, the shear viscosity, and the average fiber diameter were measured by the above-described methods.

TABLE 1

| | | | Unit | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Resin composition | Composition | Linear polypropylene 1 (MFR: 1550 g/10 minutes) | % by mass | 99.0 | 98.0 | 97.0 | 84.0 | 100.0 | 99.5 | 90.0 | 99.0 | 49.0 | 49.5 |
| | | Long-chain branched polypropylene (LCBPP) (MFR: 9 g/10 minutes) | % by mass | 1.0 | 2.0 | 3.0 | 1.0 | 0.0 | 0.5 | 10.0 | 0.0 | 1.0 | 0.5 |
| | | Linear polypropylene 2 (MFR: 9 g/10 minutes) | % by mass | 0.0 | 0.0 | 0.0 | 0.0 | 0.0 | 0.0 | 0.0 | 1.0 | 0.0 | 0.0 |
| | | Linear polypropylene 3 | % by mass | 0.0 | 0.0 | 0.0 | 15.0 | 0.0 | 0.0 | 0.0 | 0.0 | 50.0 | 50.0 |
| | Physical properties | Shear viscosity ($2.5 \times 10^2$ [1/s]) | Pa·s | 16 | 16 | 16 | 9 | 15 | 15 | 19 | 16 | 4 | 4 |
| | | Elongational viscosity ($2.5 \times 10^2$ [1/s]) | Pa·s | 623 | 724 | 889 | 562 | 420 | 505 | 1440 | 443 | 441 | 241 |
| | | Elongational viscosity/ shear viscosity | — | 38.9 | 45.3 | 55.6 | 62.4 | 28.0 | 33.7 | 75.8 | 27.7 | 110.3 | 60.3 |
| Nonwoven fabric | | Average fiber diameter | μm | 1.5 | 1.3 | 2.7 | 1.2 | 2.8 | 2.7 | 6.5 | 2.9 | Spinning impossible | Spinning impossible |
| | | Dd/Da | % | 76 | 73 | 83 | 84 | 131 | 113 | 132 | 138 | | |
| | | Content of fibers with 5-times fiber diameter | % | 12.0 | 11.0 | 15.0 | 18.0 | 25.0 | 22.0 | 29.0 | 33.0 | | |

In Table 1, the details of the linear polypropylene 3 are as follows.

Linear polypropylene 3 (low molecular weight linear polypropylene), weight-average molecular weight: 7700, manufactured by Mitsui Chemicals, Inc., trade name: NP055

In Table 1, "spinning impossible" means that spinning was impossible.

As apparent from Table 1, the melt blown nonwoven fabrics of Examples have low contents of fibers with 5-times fiber diameter and have small average fiber diameters as compared to melt blown nonwoven fabrics of Comparative Examples. In addition, the standard deviation of fiber diameter distribution, that is, the standard deviation of average fiber diameter/average fiber diameter is small in the melt blown nonwoven fabrics of Examples.

Accordingly, it is understood that when the melt blown nonwoven fabrics of Examples are used as filters, collection efficiency of fine particles is excellent.

The disclosure of Japanese Patent Application Laid-Open No. 2018-066081 filed on Mar. 29, 2018 is incorporated herein by reference in its entirety.

All documents, patent applications, and technical standards described in this specification are incorporated herein by reference to the same extent as if each individual document, patent application, and technical specification are specifically and individually indicated to be incorporated by reference.

The invention claimed is:

1. A meltblown nonwoven fabric, comprising resinous polypropylene fibers, wherein the fibers have an elongational viscosity, as measured under conditions at an elongational strain rate of $2.5 \times 10^2$ (1/s) and a temperature of 160° C., of from 430 Pa·s to 1200 Pa·s, and a ratio of the elongational viscosity (Pa·s) to a shear viscosity (Pa·s) of the fiber, as measured under conditions at a shear strain rate of $2.5 \times 10^2$ (1/s) and a temperature of 160° C., is from 35 to 65.

2. The nonwoven fabric according to claim 1, wherein the shear viscosity is from 10 Pa·s to 20 Pa·s.

3. The nonwoven fabric according to claim 1, wherein the resin composition contains a long-chain branched polypropylene.

4. The nonwoven fabric according to claim 3, wherein a content of the long-chain branched polypropylene is from 0.7% by mass to 5% by mass with respect to a total mass of the resin composition.

5. The nonwoven fabric according to claim 1, wherein the resin composition further contains a linear polypropylene.

6. The nonwoven fabric according to claim 5, wherein a content of the linear polypropylene is from 95% by mass to 99.3% by mass with respect to a total mass of the resin composition.

7. The nonwoven fabric according to claim 5, wherein the linear polypropylene comprises a linear polypropylene having a weight-average molecular weight of 20,000 or more.

8. The nonwoven fabric according to claim 7, wherein a content of the linear polypropylene having a weight-average molecular weight of 20,000 or more is 50% by mass or more with respect to a total mass of the linear polypropylene.

9. The nonwoven fabric according to claim 5, wherein the linear polypropylene comprises a linear polypropylene having a weight- average molecular weight of less than 20,000.

10. The nonwoven fabric according to claim 9, wherein a content of the linear polypropylene having a weight-average molecular weight of less than 20,000 is 50% by mass or less with respect to a total mass of the linear polypropylene.

11. The nonwoven fabric according to claim 1, wherein the fibers have an average fiber diameter (Da) of 2.7 μm or less.

12. The nonwoven fabric according to claim 11, wherein a ratio of a standard deviation (Dd) of the average fiber diameter to the average fiber diameter (Da) (Dd/Da) is from 70 to 100.

13. The nonwoven fabric according to claim 1, wherein, in the fibers, a content of fibers having a fiber diameter that is 5 or more times as large as the average fiber diameter is 20% by mass or less.

14. A filter, comprising the nonwoven fabric according to claim 1.

* * * * *